United States Patent
Stark (10) Patent No.: US 9,731,488 B2
(45) Date of Patent: Aug. 15, 2017

(54) METHOD FOR LAMINATING A TUBULAR FILM

(71) Applicant: Buergofol GmbH, Siegenburg (DE)

(72) Inventor: Kurt Stark, Neuhaus a.d. Pegnitz (DE)

(73) Assignee: Buergofol GmbH, Siegenburg (DE)

( * ) Notice: Subject to any disclaimer, the term of this patent is extended or adjusted under 35 U.S.C. 154(b) by 29 days.

(21) Appl. No.: 14/246,464

(22) Filed: Apr. 7, 2014

(65) Prior Publication Data
US 2014/0299251 A1    Oct. 9, 2014

(30) Foreign Application Priority Data

Apr. 5, 2013 (DE) .................... 10 2013 103 448
Nov. 27, 2013 (DE) .................... 10 2013 113 121

(51) Int. Cl.
*F16L 55/165* (2006.01)
*B32B 1/08* (2006.01)
(Continued)

(52) U.S. Cl.
CPC ............ *B32B 37/14* (2013.01); *B32B 1/08* (2013.01); *B32B 27/12* (2013.01); *B29C 47/0021* (2013.01); *B29C 47/0026* (2013.01); *B29C 47/0059* (2013.01); *B29C 47/0064* (2013.01); *B29C 53/10* (2013.01); *B29C 63/06* (2013.01); *B29C 63/065* (2013.01); *B29K 2105/0809* (2013.01); *B29K 2105/0818* (2013.01); *B29K 2713/005* (2013.01); *B29L 2023/006* (2013.01);
(Continued)

(58) Field of Classification Search
CPC ... F16L 2011/047; F16L 55/1656; B32B 1/08; B32B 37/14; B32B 37/16; B29C 47/0026; B29C 47/005; B29C 47/0052; B29C 47/0059; B29C 53/36; B29C 63/06; B29C 63/065; B29L 2023/006; E03F 2003/065
See application file for complete search history.

(56) References Cited

U.S. PATENT DOCUMENTS 4,009,063 A  *  2/1977  Wood ................. B29C 53/36
                                         138/141
5,798,013 A  *  8/1998  Brandenburger ..... B29C 53/382
                                         156/188
(Continued)

FOREIGN PATENT DOCUMENTS

DE     198 23 714 A1    12/1999

OTHER PUBLICATIONS

EP Search Report, Sep. 22, 2014.
German Patent Office Search Report, Dec. 5, 2014.

*Primary Examiner* — Carson Gross
(74) *Attorney, Agent, or Firm* — Dority & Manning, P.A.

(57) ABSTRACT

The invention refers to a method for laminating a tubular film (1) preferably manufactured by means of blown film (co-) extrusion with a material capable of absorbing resin or liquids, wherein the tubular film (1) is laminated over its entire perimeter with several layers (10, 11, 12, 13; 20, 21, 22; 30, 31) overlapping or positioned directly opposite one another on their front sides containing material capable of absorbing resin or liquids, so that essentially there are no areas left along the perimeter of the tubular film (1) not covered by the laminated layers (10, 11, 12, 13; 20, 21, 22; 30, 31). The invention also refers to a tubular film laminated in such a way and to various applications.

15 Claims, 6 Drawing Sheets

(51) Int. Cl.
  *B29C 63/06* (2006.01)
  *B32B 37/14* (2006.01)
  *B32B 27/12* (2006.01)
  *F16L 11/04* (2006.01)
  *E03F 3/06* (2006.01)
  *B29L 23/00* (2006.01)
  *B32B 37/16* (2006.01)
  *B29C 47/00* (2006.01)
  *B29C 53/10* (2006.01)
  *B29K 105/08* (2006.01)

(52) U.S. Cl.
  CPC ......... *B32B 37/16* (2013.01); *E03F 2003/065* (2013.01); *F16L 55/1656* (2013.01); *F16L 2011/047* (2013.01); *Y10T 156/10* (2015.01)

(56) References Cited

U.S. PATENT DOCUMENTS

| | | | |
|---|---|---|---|
| 5,883,028 A | 3/1999 | Morman et al. | |
| 6,196,271 B1* | 3/2001 | Braun et al. | 138/98 |
| 6,679,966 B1 | 1/2004 | Brandenburger | |
| 8,361,580 B2 | 1/2013 | Stark et al. | |
| 8,794,269 B2 | 8/2014 | Hummel | |
| 2005/0245162 A1 | 11/2005 | McCormack et al. | |
| 2010/0075078 A1* | 3/2010 | Quitter | B32B 5/04 |
| | | | 428/35.2 |
| 2013/0074972 A1 | 3/2013 | Fuechtjohann et al. | |
| 2013/0098495 A1* | 4/2013 | Fasel | F16L 11/08 |
| | | | 138/125 |

\* cited by examiner

METHOD FOR LAMINATING A TUBULAR FILM

FIELD OF THE INVENTION

The invention refers to a method for laminating a tubular film preferably manufactured by means of blown film (co-) extrusion. In addition, the invention refers to a correspondingly laminated tubular film and its applications.

BACKGROUND

The field of application of tubular films that have, for example, an olefin homo- or copolymer layer such as a polyethylene (PE) layer and a polyamide (PA) layer, for example, is very large. Some of the areas where they are used are, apart from the packaging industry, the tube lining system for pipe renovation, particularly trenchless sewage pipe renovation or pressure pipe renovation. In trenchless sewage pipe renovation, it is for example known from the glass fiber tube liner system with UV or steam curing that a thick-walled, high-density PE film (HDPE—high density polyethylene) is introduced first as sliding film—mostly in the cross-section form of a semicircle—and placed tightly against the pipe's inner wall. Afterwards, a flexible insertion tube developed as tubular film is drawn in (drawing-in process), in which case the insertion tube slides over the sliding film. On the one hand, this protects the insertion tube from damage caused by the pipe's inner wall or objects inside the pipe and, on the other hand, this significantly lowers the friction between insertion tube and sliding film, thus facilitating the drawing in of the insertion tube.

In the glass fiber pipe liner system with UV- or steam curing, such an insertion tube (tube liner) has typically an outer hose developed as a tubular film (outer tubular film) and an inner hose developed as tubular film (inner tubular film). Between them, a carrier material (e.g. glass fibers) impregnated with reactive plastic resin has been built in. Some of the reactive plastic resins that can be used are, for example, commercially available UP resins (polyester or unsaturated polyester resins), VE resins (vinyl ester resins) or EP resins (epoxy resins). In UP or VE resins, their curing can be done with the help of photo initiators, but the curing can also take with heat. In the pipe, the insertion tube is inflated from the inside by compressed air directed against the mechanically stable inner tubular film until the latter makes tight contact with the pipe's inner wall or sliding film in order to subsequently cure the resin with UV light from a UV light source being moved slowly through the interior of the inflated insertion tube, for example. Depending on the kind of embodiment of the inner tubular film of the insertion tube, it stays inside the pipe or is pulled out and removed.

To prevent undesired, premature curing of the plastic resin before introduction into the pipe to be renovated (particularly during storage), it is necessary for the outer tubular film of the insertion tube to have or consist of a protective layer that prevents a premature exposure of the resin to UV radiation or shorter-wave radiation of visible light, which would cause premature hardening of the resin. The inner tubular film of such an insertion tube must, however, be highly permeable to UV radiation and shorter-wave radiation of visible light. This makes the curing process possible, which is done in the tube liner inflated inside the pipe by a radiation source being pulled along the inner side of the tube liner, i.e. inside the inner tubular film.

Instead of the sliding film described above, a preliner (also known as preliner film) is introduced into the pipe to be renovated—especially in the synthetic fiber tube liner system with warm water or steam curing. A preliner, which typically consists of PE having a high density (HDPE—high density polyethylene), is a thick-walled film that lines the pipe fully and also prevents the tube liner from making direct contact with pipe's inner wall. To accomplish this, the preliner is placed tightly against the inner wall of the pipe and then the pipe liner is drawn into the pipe (drawing-in process) or inverted (inversion process). For example, the preliner prevents the plastic resin of the tube liner from gluing to the wall of the sewage pipe and the still uncured resin from making contact with dirt and water. Furthermore, the preliner film also prevents the resin from escaping to the sewage pipe renovation system and contaminating the soil and groundwater. The preliner film also protects inlets from penetrating excessive resin so no resin plugs and obstructions can form. Additionally, during the drawing-in process, a preliner assumes a similar function to reduce sliding friction as the sliding films described above for the tube liner to be drawn in. In this case, low coefficients of friction between sliding film or preliner and the outer film of the tube liner are essential. As a result of this, during drawing into the pipe, the insertion tube or tube liner is not damaged by the pipe's inner wall or objects inside the pipe and, on the other hand, the friction between tube liner and sliding film or preliner remains very low and facilitates the drawing in of the pipe liner.

It is known from state of the art to laminate both the outer tubular film and inner tubular film on the side facing the resin-impregnated carrier material with a nonwoven. In EP 1 180 225 B1, the main objective is the lamination of the outer tubular film, although lamination of the inner tubular film is mentioned. Lamination with a nonwoven layer has the advantage of facilitating the bonding of the corresponding tubular film to the resin-impregnated carrier layer, since the resin penetrates into the nonwoven layer and thereby prevents a displacement of the tubular film towards the carrier layer. Once the resin has cured, bonding to the nonwoven material is very strong and virtually impossible to separate. Also, this boosts the stability of the corresponding tubular film and a more uniform expansion when raising the tube liner inside the pipe to be renovated is made possible.

EP 1 180 225 B1 mentioned above also describes, as part of the manufacturing of the nonwoven laminated tubular film, the bonding of the border areas of two film bands running parallel to one another with the already previously laminated nonwoven. These border areas are not laminated because otherwise a bonding would not be possible.

EP 2 573 442 A1 likewise describes a bonding along a longitudinal seam, in this case for an inner tubular film laminated with a nonwoven.

The bonding or connection points are a disadvantage in the tubular flat films known because the places where they lack a nonwoven layer are less stable. Thus, a tubular or sealed or bonded flat film can open directly on the sealing seam or in close proximity to it because when a flat film is sealed to become tube shaped, the film thins out in the sealing area, but gets thicker in other areas.

SUMMARY OF THE INVENTION

It is a task of this invention to provide a method with which mechanical weak points in a tubular film laminated with a nonwoven material or a similar one capable of absorbing resins and liquids can be lessened or fully eliminated. Additional objects and advantages of the invention will be set forth in part in the following description, or may be obvious from the description, or may be learned through practice of the invention.

In the method according to the invention, this task is solved by the characteristics set forth in the appended claims.

The advantages of the invention can be seen especially in the fact that the covering—largely extensive and extending in longitudinal direction of the tubular film—on all its perimeter sections with layers containing material capable of absorbing resin or liquids preferably should not leave any or almost no areas of the tubular film—particularly no laying edges—without material capable of absorbing resin or liquid. In this case, the tubular film can be bonded completely to the absorbent material. The result is a laminated tubular film with much better mechanical properties.

However, a full bonding of all perimeter areas of the tubular film with said layers extending along its longitudinal direction need not necessarily be provided within the framework of the invention; a bonding or lamination not encompassing the full perimeter surface with a nonetheless full or largely full covering (see below) of the tubular film by said layers, however, is also included by the invention and the term "laminated [ . . . ] over its entire perimeter", something that is also technically necessary in part. Therefore, there can be some non-laminated areas but loosely covered by parts of the layers, for example in overlapping areas of layers in which the layer lying on top can be bent up or away from the tubular film and placed on top of the lower layer clinging to the tubular film. As a result of this, a transition edge without direct adhesive bonding between the tubular film and the top layer covering the tubular film is created.

The term "largely" in the statement "no areas largely uncovered by the laminated layers" in the claims must be understood that only very small areas of the tubular film, at most, are not covered by the laminated layers, especially in case the front side of the ends of the laminated layers are very close (several mm) or lie opposite one another making contact, but do not overlap. When a tubular film laminated in such a way is expanded, there can be a small gap in the edges of the frontside laminated layers opposite one another, in which case this gap is preferably not larger than 10 mm. However, full covering is preferred, so there are no longer any uncovered areas of the laminated layers along the perimeter of the tubular film.

Owing to the largely complete covering with layers capable of absorbing resins or liquids (i.e. running over the entire perimeter) according to the invention, weak points in the tubular film that could have fatal consequences when bursting can be effectively prevented.

According to the preferred embodiments, the tubular film preferably fully covered by the layers capable of absorbing resin or liquid and preferably mostly bonded to them has in this case no seam. The tubular film is obtained here preferably directly by blown film extrusion.

The invention also comprises laminated tubular films—preferably manufactured by the method according to the invention—and various applications described below. Accordingly, a tubular film according to the invention, manufactured preferably by means of blown film (co-) extrusion, is laminated with layers capable of absorbing resin or liquids in such a way over its entire perimeter with several overlapping or opposing layers in their front sides that there are largely no more areas covered any longer by the laminated layers along the perimeter of the tubular film. The tubular film laminated according to the invention has preferably at least a few of the properties related to the method according to the invention (materials, measurements, weights, etc.) described above and below.

The lamination is very preferably made in such a way that the lateral edges of the tubular film are laminated with the layers when the former is extended flat or in a rolled-up state, i.e. when they are not just loosely covered with a layer. Regarding mechanical stability, such edge lamination is especially advantageous because the edges represent weak points especially when the tubular film is expanded.

If the issue here is lamination of the tubular film with layers capable of absorbing resin or liquids, the term "layer" is also understood to be a multilayered layer. In other words, a layer to be laminated on the tubular film can have several layers—even if this does not represent the preferred embodiment—in which case, for functional reasons, at least the outermost layer facing away from the tubular film contains the material capable of absorbing the resin.

Materials capable of absorbing resin or liquids can be made especially of fibers, preferably in the form of nonwovens, felts, woven cloths, knitted textures, knitted fabrics, laid webs, textiles in general, but also in the form of foamed materials. It is preferable if the materials used are elastic, so that when the tubular film is expanded, the laminated layers can also expand and do not detach from the tubular film or each another. Here, capable of absorbing means that the material can absorb liquid or resin—at least partially. Ideally, the material becomes impregnated with resin and liquid.

Within the framework of this invention, the term "nonwoven" is an entity made of fibers of limited length, continuous fibers or cut yarns of any kind and any origin joined together in any way so they become a nonwoven or fiber layer or fibrous web joined together in some way. Not included here is the crossing or interlacing of yarns, as occurs during weaving, mechanical knitting, knitting, lace manufacturing, plaiting and the manufacturing of tufted products. The great majority of nonwoven materials form flat textile entities because their main structural element is made up of textile fibers.

Jeans material can be used for the fiber, but also other fibers, knitted textures, knitted fabrics, etc, can be used as long as they can absorb resin or liquids.

Glass nonwovens are also recommended, as they are very transparent and thus boast very high transmission of UV-Vis radiation that greatly favors resin curing.

It should also be mentioned that—when a bottom and top side are mentioned as part of this invention—no limitation is meant; rather, these terms refer generally to two extensive, opposing surfaces of said tubular film.

The tubular film used for lamination is preferably manufactured through (co-) extrusion, especially preferably through blown film (co-) extrusion, if possible without sealing seam. Alternatively, the tubular film can initially be obtained as cast film through cast (co-) extrusion or as another flat film. Such films can then, before lamination according to the invention, be sealed to become a tube. An embossing, stretching, conditioning (reversible absorption of moisture, preferably of water by a thermoplastic plastic material such as a homo- or copolyamide) and/or imprinting of the films according to the invention can be advantageous. However, it is better for the tubular film not to be oriented or only slightly so. Preferably, the tubular film is transparent.

It is advantageous if the tubular film is still pretreated for lamination (to undergo Corona, plasma or flame pre-treatment, for example) to increase the tubular film's surface tension and therefore obtain an inseparable bonding of the tubular film to the resin- or liquid-absorbent material. Likewise, the material capable of absorbing resins and liquids can be subject to such pretreatment to increase the composite adhesion to the—preferably pretreated—tubular film even more.

According to an advantageous embodiment of the method according to the invention, after the successive or simultaneous lamination of the top and bottom sides in the initial flat state of the tubular film, the latter is turned, twisted or rolled at an angle in such a way that the two edges now lie opposite one another on the newly created flat sides of the tubular film (aligned on top of one another or displaced to each other). If turned or rolled by 90° (which is advantageous), the two laying edges, which in the initial flat state of the film were laying at maximum distance from each other, now lie directly opposite one another. This has the advantage that the edges to be laminated can then be centrically introduced in lamination direction because their respective separation from the "new" laying edges in the second, flat state, of the tubular film is equally large. The "new" bottom and the "new" top side can then be laminated successively or simultaneously with the layers capable of absorbing resin or liquids.

Material capable of absorbing resin or liquid can be saved when the width of the layers laminated in the second (flat) state is smaller than the width of the layers laminated in the first (flat) state. In this case, the respective layer width can preferably be one-half or less than the tubular width laid out flat. Naturally, narrower layers for the lamination in the first (flat) state and wider layers after turning the film can be chosen. Even roughly equally wide lamination layers are possible.

According to another advantageous alternative, only one side of the tubular film laid out flat is turned soon after lamination, preferably by about 120°. On the side that now has non-laminated and already laminated areas, a second layer is laminated. After another turning, once again advantageously by about 120°, the last, third layer is laminated. Each one of the layers overlaps in the border areas; if only slight overlapping is selected, lamination material can be saved. Once again, it is important here that no uncovered, non-laminated areas remain along the tubular film's perimeter.

The width of the laminated layers capable of absorbing resin or liquid in the first and/or second (and/or according to the—third—embodiment described above), state is, according to a preferred embodiment, no more than the width of the tubular film laid out flat. In this case, the absorbent layers end flush with the tubular film laid out flat. Alternatively or additionally, one or several of the absorbent layers laminated in the first and/or second and/or third flat state of the tubular film are laminated with an excess length of preferably up to 100 mm over the tubular film's corresponding edges. Different design possibilities result here and in most cases, the laminated layers are joined to one another or overlap.

The widths of the laminated layers capable of absorbing resin or liquid can be identical or different. In advantageous embodiments, overlapping areas are kept relatively small in order to save on resin- or liquid-absorbent material.

Instead of four or three lamination layers distributed and laminated over the perimeter of the tubular film, it is also possible to advantageously laminate merely two layers containing resin- or liquid-absorbent material. The resulting reduction of lamination steps simplifies the process. To achieve this, the tubular film is laid out flat once again and one layer capable of absorbing resin or liquid is laminated on its top and bottom side, either simultaneously or successively (i.e. in the latter case, one side is laminated first, then the tubular film is turned around and the second side is laminated). This lamination is done so that when the tubular film is expanded (when it has a largely circular cross section), the respective ends of the two laminated layers overlap slightly or at least bump into one another.

In corresponding designs, at least one of the two mentioned resin- or liquid-absorbent layers lies with an excess length of preferably up to 100 mm over at least one of the two lateral edges of the tubular film laid out flat. Alternatively—or as one of the above-mentioned laminated layers lying opposite the other one—at least one of the layers can be laminated essentially in the width of the tubular film laid out flat.

According to the previous description, different embodiments can be created. According to one variant, both layers (i.e. the one on the bottom and the other one on the top side of the tubular film) are laminated in this case with an excess length of up to 100 mm on the two lateral edges either successively or simultaneously, and pressed against one another in that spot so they bond to one another without being folder over. Here, the projecting areas are joined together and also bond very firmly to the tubular film. As a result of this, both edges of the tubular film are covered (virtually "welded in" from the two sides made of nonwoven material, for example). Afterwards, the projecting layer areas glued onto each other can be cut off, naturally without damaging or slitting the tube while doing so. However, it is preferable to select the widths of the layers to be laminated in such a way that subsequent cutting can be dispensed with. Convenient layer projections are, for example, 3 to 30 mm on both sides. When used as inner tubular film, the layers of the tubular film laminated in this way can easily be bonded to the resin. In this case, when the inner tubular film is expanded in the sewage pipe to be renovated or in a pipe as well (preferably a pressurized pipe), the protruding areas of the layers are bent and positioned tightly against the neighboring layer areas from the outside. As explained farther below, the substance that bonds the two substances together can be an adhesive used during extrusion lamination, particularly an adhesive that joins together both the two layers and the tubular film with the layers. Such an adhesive, a hot melt, a conveniently developed polymer for the corresponding gluing or another suitable substance, make a firm bond possible between the parts to be joined together.

It should be noted that, generally speaking, lamination can take place additionally (or alternatively) to a material bonding also through a firm bond. Moreover, instead of the preferred full bonding, partial joining together can also be accomplished by layering or providing the resin- or liquid-absorbent layers with glue, e.g. in form of a narrow dot matrix, striped application, etc.

Going back to the various layer-overlapping embodiments, according to another variant, both layers are laminated with an excess length, which can preferably be up to 100 mm long, over which in each case another one of the two edges is laminated. Accordingly, one layer protrudes on one side or over an edge of the tubular film, while the opposite layer applied on the other side of the tubular film protrudes on the other side or above the other edge. The corresponding other end of the layers ends preferably and largely flush on the corresponding other edge or has been chosen in such a way that when the completed laminated tubular film has been expanded, both layers overlap in the edge area. If now, during the course of lamination—particularly of extrusion lamination—the glue, hot melt or joining polymer escapes through the edges, the layer to be applied through lamination can be bent by about 90°, pressed against the edge area by forming an adhesive bond and be glued onto it. The layer area still protruding over the edge expediently covers—in the expanded state of the laminated film—the neighboring areas of the respective edge. Therefore, in the expanded state of the tubular film (circular in cross section), the one laminated layer overlaps the one edge of the tubular film, while the layer laminated on the other side overlaps the other edge. Instead of the approximate 90° bending mentioned above, a bending of the edge-sided protruding layer can also be bent on the corresponding edge of the tubular film by almost 180° so the protruding border of one layer can be glued on the other layer.

In another variant, one of the layers is laminated preferably with an excess length of up to 100 mm over the two lateral edges, while the other layer is laminated on the other side of the tubular film laid out flat with a width that corresponds essentially to that of the tubular film or is narrower. As with the previous embodiment, the glue or joining polymer used for the lamination, particularly for the extrusion lamination, escapes through the edges and allows the wider layer to be applied through lamination to be bent on the edge of the tubular film by preferably about 90° so it can be pressed against it there and glued onto it. Thus, a tubular film is obtained in which—in the expanded state—both edges are overlapped by the protruding wider layer. Instead of getting the approximate bending of approx. 90° mentioned above, a bending of almost 180° of the wider laminated layer can be accomplished on the edges of the tubular film so the borders of the wider layer can be glued on the narrower layer.

Another preferred alternative provides the lamination of one layer with the material capable of absorbing resin or liquids on one side of the tubular film with an excess length of preferably up to 100 mm over both lateral edges of the tubular film. The two edges of this layer are then turned over by 180° on the edges and pressed against the tubular film to create a material bond using a suitable adhesive. Afterwards, the other layer is laminated on the other side of the tubular film, in which case the width of this layer has been chosen in such a way that it not only covers the still remaining uncovered areas of the tubular film, but also the turned-over edges of the layer that was laminated first.

According to another variant, both layers are laminated—simultaneously or successively on the bottom and top side of the tubular film—with a width that largely corresponds to that of the tubular film, ending flush with the edges of the tubular film or protruding slightly. This is done in such a way that later, when the tubular film has been expanded, the respective ends of the two laminated layers bump into one another or lie directly opposite each other.

Preferably, tubular films are used having a spread out tubular width of 20 mm to 4000 mm, preferably from 50 mm to 3200 mm.

Moreover, the tubular films used for lamination have a preferred thickness of 20 μm to 4000 μm and preferably between 50 μm and 500 μm.

The layer of the tubular film facing the layers capable of absorbing resin or liquids is preferably a layer containing a thermoplastic olefin homo- or copolymer, advantageously more than 50% by weight, preferably more than 75% by weight and very preferably more than 95% by weight. Said thermoplastic olefin homo- or copolymer is preferably a polyethylene (PE), which has the advantage that the absorbent material can be easily bonded to the PE through extrusion lamination.

According to a preferred embodiment, the material to be used for lamination, which bonds the tubular film to the resin- or liquid-absorbent layer through extrusion lamination or by applying hot melt, can be a polymer that corresponds chemically to the material of the external layer of the tubular film on which the material capable of absorbing resin or liquid should be joined to. If the external side of the tubular film is polyamide-based, for example, then polyamide as binding material can also be used for binding the resin- or liquid-absorbent material. In this way, it can be ensured that not only a joining with the absorbent layer is made possible, but especially also a bonding to the external material of the tubular film on which the lamination will take place. Polymers having comparable chemical basis or belonging to the same polymer class are, if need be, also suitable because they typically also bond very well to one another.

To bond the resin- or liquid-absorbent material to a polyamide- or another polymer-based tubular film layer, compounds similar to adhesive promoters can especially be selected. Within the framework of this invention, functionalized polymers (i.e. those that have a chemical function like maleic anhydride groups, acid groups, hydroxyl groups, amine groups, epoxy groups) have proven useful. Such functionalized polymers, which are often used as adhesive promoters, are generally suitable for bonding the resin- or liquid-absorbent material to the film, regardless of what material the film layer contains, on which the lamination will be applied. Thus, an inseparable bond for the material capable of absorbing resin or liquids and the film can also be accomplished for thermoplastic elastomers (TPE), especially for thermoplastic polyurethane (TPU).

Suitable adhesives are, among others, the systems of the Jowat AG Co. of Detmold, for example, melt-type adhesives (EVA, PA, PO, PSA), reactive melt-type adhesives (PUR, POR), dispersion adhesives (PVAc, EVA, PU and others), solvent adhesives (styrene copolymers, CR, PU), reactive 1K/2K systems (PU and SE polymers), pressure-sensitive adhesives and adhesive promoters/primers.

Extrusion lamination is the preferred lamination method within the framework of thus invention, but a possible alternative is adhesive lamination, done with glues that contain solvents (LH) and do not contain solvents (LF). The application of the adhesive needed for bonding the film and absorbent material to the tubular film to be laminated can take place with the usual methods, such as application with rollers or pouring through strip dies—which is preferred. Alternatively (or, if need be, additionally), the adhesive is applied on the lamination layers. A melt pump can also be used for the application. These methods are known to the expert. Generally speaking, they involve coating equipment. Suitable equipment is manufactured by the Ico System international Coating GmbH Co. of Luneburg, for example.

According to a further alternative, heat lamination can also be used, in which case the external layer of the film to be laminated is provided with a heat-activated adhesive during the course of co-extrusion. Many different heat-activated materials can be used, e.g. polyolefin plastomers (POP), polyolefin elastomers (POE), ethylene vinyl acetate copolymers (EVAc), etc., including their mixtures. Under heat and pressure, the tubular film can then be bonded to the material capable of absorbing resin or liquids (e.g. a nonwoven). Since in this case the absorbent material is not provided with an adhesive (so no separate adhesives, hot melt, etc. are necessary), but the film during the course of the coextrusion, the nonwoven must be pressed against the film's edges.

Pretreatment of the tubular film is recommended for all kinds of lamination, preferably by a Corona pretreatment to increase the tubular film's surface tension. Pretreating the resin- and liquid-absorbent material in such a way is also recommended.

The tubular film used for lamination is preferably a multilayered film. Such correspondingly advantageous tubular film has at least one film layer that preferably does not face the resin- or liquid-absorbent layers and contains a homo- or copolyamide (PA), advantageously more than 50% by weight, preferably more than 75% by weight, and very preferably more than 95% by weight. Polyamide has very high wear resistance, high strength and toughness and is also characterized by good resistance to chemicals. Its sliding properties are also good. When used as inner tubular film for the pipe lining process, which is manufactured especially well applying the method according to the invention, the polyamide acts especially as barrier against monomers such as styrene, for example.

Another correspondingly advantageous tubular film has at least one film layer—not facing the resin- or liquid-absorbent layers—that contains preferably a thermoplastic elastomer (TPE), preferably thermoplastic urethane (TPU), advantageously more than 50% by weight, preferably more than 75% by weight, and very preferably more than 95% by weight. TPE has very high wear resistance, very good abrasion resistance and high strength, elasticity and toughness, as well as good resistance to chemicals. Sliding properties are good too.

Preferably, the tubular film used for lamination has a 3-layer structure, a 4-layer structure, a 5-layer structure or a 7-layer structure. For an inner tubular film, 3-layer films with the structure PE/AP/PA (polyethylene/adhesive promoter/polyamide), PA/AP/TPE or TPU/PA/TPU or PA/TPU/PA or PE/AP/TPU (in which case the outer layers can also be interchanged) or 5-layer films PE/AP/PA/AP/PE or PE/AP/PE/AP/PA or PE/AP/TPU/AP/PA or PE/AP/PA/AP/TPU or PE/AP/PA/TPU/TPU are preferred (in which case each one of the outer layers can also be interchanged in case the layers have a non-symmetrical structure). It should be noted that an adhesive promoter is not necessarily required for bonding a TPU layer to a polyamide layer. A five-layered film can also have, for example, a layer succession of PA/AP/PE/PE/PE or PA/AP/PA/AP/PE, a seven-layered film, for example, a layer succession of PE/PE/AP/PA/AP/PE/PE, PA/AP/PE/PE/PE/PE/PE or PA/AP/PA/AP/PE/PE/PE or PA/AP/PA/AP/PA/AP/PE. Other multilayer structures having another number of layers too are readily possible within the framework of this invention. Likewise, all usual materials used for film extrusion are suitable for the tubular film.

Therefore, the materials especially preferred for film layers are TPE, in particular TPU, PA (polyamide) and polyolefins. As part of this invention, and depending on polymer class, the same or different materials of these polymer classes can be used in the film.

It is better if elastic resin- or liquid-absorbent materials are used for the layers utilized in the lamination, for example in form of polyester nonwovens with a polyethylene coating or pure polyethylene nonwovens or polypropylene nonwovens or polyacrylonitrile (PAN)-based materials or also glass nonwovens.

The basis weight of the absorbent layers is advantageously between 5 g/m$^2$ and 500 g/m$^2$, preferably between 20 g/m$^2$ and 500 g/m$^2$, very preferably between 30 g/m$^2$ and 300 g/m$^2$. The thickness of the absorbent layers is preferably up to 1 cm, preferably up to 5 mm and very preferably up to 2.5 mm.

The inner tubular film manufactured especially preferably with the method according to the invention can be used both in the UV light curing process with GFK and in the inversion process. Here, the seamless inner tubular film remains in the pipe after the resin has cured.

The inner tubular film can be advantageously elongated at least 15%, preferably 20%, very preferably 25% and ideally 30% and more (especially in radial direction), without one layer tearing open (so-called splice) and particularly without the inner tubular film bursting open, thus damaging the tube liner. The absorbent material used for resin or liquids has been selected in such a way that it can elongate together with the inner tubular film, so that the extended tubular film is still fully covered with resin- or liquid-absorbent material.

The inner tubular film laminated according to the invention can easily meet the otherwise necessary requirements of an inner tubular film for sewage pipe renovation (generally speaking: pipe renovation, specifically: tube lining technique), in particular:

Permeability for UV light for curing the reactive resin when the tube liner is designed as GFK liner, Thermal stability for curing the resin with heat or water vapor Break starting only at more than 100% elongation in the blow test, Mechanical strength, i.e. defined, not too large elongation when a force is exerted, particularly when the tube liner is pulled through the pipe with an inner tubular film laminated according to the invention, Incorporation of polyamide as barrier for monomers such as styrene, Thermal resistance on the side facing the resin (at least 120° C.), No interactions (such as swelling or dissolving) of the film layer bordering the resin with the latter, thus impairing the inner tubular film.

Hence, the inner tubular film laminated according to the invention is advantageously at least partially permeable to UV radiation, i.e. electromagnetic radiation in a wavelength range of about 200 to about 400 nm, preferably at least 70% and very preferably at least 80% and ideally at least 90%. Then, a UV source can effectively act upon the carrier material preferably impregnated with reactive resin through inner tubular film laminated according to the invention in order to cure it. In a preferred embodiment, the tubular film laminated according to the invention is not only at least partially permeable to UV radiation, but in addition—and for the same reason as above—at least partially permeable to short-wave, visible light (i.e. electromagnetic radiation in a wavelength range from 400 to 500 nm, preferably from 400 to 450 nm), preferably at least 80%, very preferably 90%. It was found out that virtually no reduction of UV or light permeability resulted from the bonding of the inner tubular film with nonwoven, for example. When the (frequently whitish) nonwoven makes contact with the resin, it becomes transparent and colorless.

The tubular film according to the invention is therefore mostly preferred as inner tubular film, but also advantageously as supporting or calibration film for tube liners or as sliding or preliner film for pipe renovation, in particular trenchless pipe renovation, likewise used in each case in tubular form. For use as sliding or preliner film, previous turning inside out (inversion) of the tubular film according to the invention is recommended, so that the side with the resin or liquid-absorbent layers lies inward and can bond with the resin.

Within the framework of this invention, a calibration hose is one whose function corresponds essentially to the inner tubular film in the UV-/light-curing glass fiber liner system. After or simultaneously after incorporating a synthetic felt liner impregnated with thermally reactive plastic resin in the pipe to be renovated, it is form-fittingly positioned inside the pipe with the help of a calibration hose. The calibration hose can thus be a tubular film laminated according to the invention. Alternatively, the calibration hose is also a combination of a synthetic fiber felt with a film laminated according to the invention. The latter then corresponds to a "pipe-within-a-pipe system". When a calibration hose is used, the sequence is then, for example: Outside the pipe wall, then (if needed) a preliner film, then (optionally) an external film of the tube liner or coating, then carrier with synthetic fibers and resin impregnation (form the outer pipe), then synthetic fibers with (if necessary) resin plus laminated film (form the calibration hose as inner pipe). By filling the calibration hose from the inside with water, compressed air, etc., the synthetic felt liner having the carrier is positioned in the pipe to be renovated. Here, the curing of the resin also takes place from the inside, for example through hot water or water vapor.

The external tubular film, which can be manufactured by means of the method according to the invention, can have one or multiple layers. Preferably, it absorbs and/or reflects UV radiation and/or short-wave, visible light. In this case, the outer tubular film can be either opaque or at least contact transparent. Furthermore, the outer tubular film is preferably at least a contact transparent tubular film that absorbs and/or reflects UV radiation and/or short-wave, visible light. Such an external hose has been described in WO 2010/075946 A1 and in DE 10 2010 023 764 A1, and this external hose has preferably the ingredients and properties described therein.

The tubular film according to the invention is also suitable for use as UV and light protection film. Additionally, the tubular film according to the invention has a barrier layer. As with the application of the tubular film according to the invention as preliner, the tubular film completely bonded to the material capable of absorbing resin or liquids (at first on the outer side) can be inverted, so that in this case, too, the absorbent material lies inward and can bond directly to the resin.

Preferably, the tubular film according to the invention, especially if used as preliner film, inner tubular film, outer tubular film or as calibration hose, has an oxygen barrier layer, preferably an EVOH layer, a water vapor barrier layer and/or an oil barrier layer.

The invention also refers to an insertion tube (tube liner) for insertion into a pipe that is under or above the ground, especially a sewage pipe, for its renovation. The insertion tube comprises a one- or multiple-layered film impervious to liquids as an internal tube (inner tubular film in form of a tubular film) and an external tubular film (outer tubular film) impervious to liquids facing the pipe wall. A carrier material, preferably glass fiber material, is provided between the inner and outer tube that is preferably impregnated with a reactive unsaturated resin curable through UV radiation. The renovated sewage pipe is formed from this impregnated carrier material after curing. The inner and/or outer tubular film can be manufactured applying the method according to the invention with several resin- or liquid-absorbent layers laminated successively for covering all uncovered, particularly laying, edge areas. The inner and/or outer tubular film remain(s) inside the sewage pipe after the resin has hardened.

The preferred carrier materials placed between the outer and inner tubular film are glass fiber fabric, synthetic fiber felts (such as needle felts, for example), nonwovens and/or nonwoven textile products or textiles (such as knitted hoses, for example) that in each case are impregnated with at least one reactive plastic resin, preferably with at least one unsaturated polyester resin (UP resin) and $\alpha$, $\beta$-unsaturated monomers such as styrene, for example. Corresponding examples are glass fiber-strengthened plastics (GFK). Other resins that can be possibly used are, apart from the UP resins, EP and VE resins. Some commercially available resins are unsaturated polyester resins of type 1140 according to Table 3 of DIN 16 946-2 corresponding to group 3 in Table 1 of DIN 18 820.

Other areas of application of tubular film according to the invention are in packaging materials for the so-called non-food sector or for packaged foods, especially as lids and/or bottom foil, as shrink wrap or skin film, for films made for so-called bag-In-box-packaging or for tubular bags. The tubular film according to the invention can also be used for protective foils, e.g. for surface protection films or for protection suits, for cover films or agricultural films or as tubular film in the construction industry.

BRIEF DESCRIPTION OF THE DRAWINGS

The invention will now be explained with the help of some embodiments. The same reference signs in the various figures stand for the same or equivalent characteristics. The figures show.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 1:
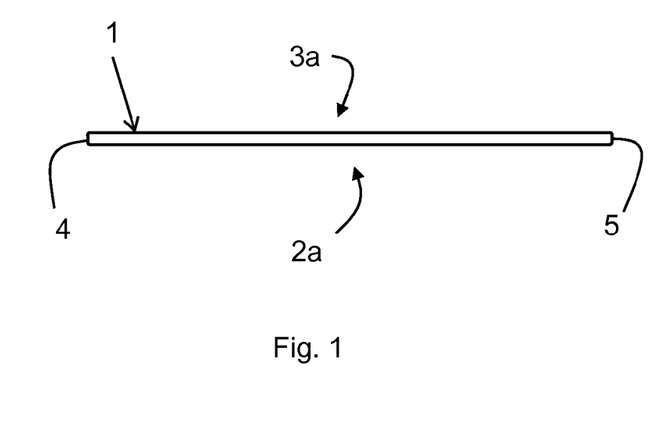
FIGS. 1-4 are successive steps of a first embodiment of a method according to the invention for laminating a tubular film shown in cross section.

FIGS. 1-4 reproduces in a simplified way the successive lamination steps of an embodiment of the method according to the invention for a tubular film 1 shown in cross section. The tubular film 1 extends many meters into the picture plane (as all others described below). In FIG. 1, the non-laminated tubular film 1 is shown in a first, laid out flat, state. In this position, the tubular film 1 has a bottom side 2a and a top side 3a, as well as two edges 4, 5 with small bending radius, which join the bottom and top side 2a, 3a together.

This tubular film 1 is laminated through known extrusion lamination, for example, on the bottom side 2a first with a layer 10 containing a material capable of absorbing resin or a material capable of absorbing liquid (however, "resin-absorbent" will hereinafter always be used to encompass both) or fully consisting of this material, and afterwards—if necessary, after turning the tubular film around depending on the lamination machine used—laminated on the top side 3a with preferably a layer 11 made of the same resin-absorbent material. The order is not important, though. This two-time lamination results in the tubular film 1 shown in FIG. 2, which has a resin-absorbent layer 10 on the bottom side 2a and a resin-absorbent layer 11 on the top side 3a.

Figure 2:
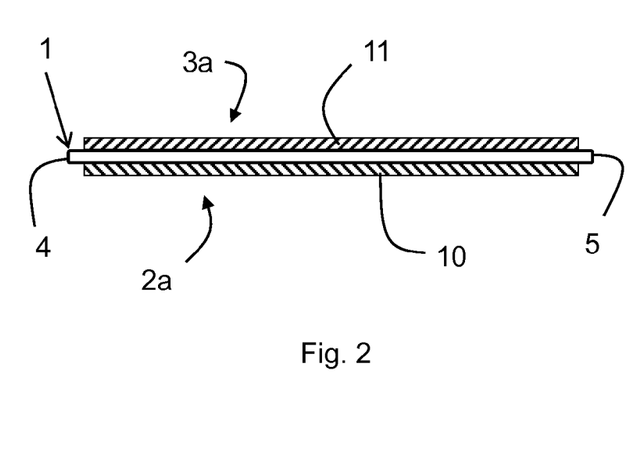

The resin-absorbent layers 10, 11 are, for example, elastic nonwovens and, in this case, polyester nonwovens having a polyethylene coating or pure polyethylene nonwovens or polypropylene nonwovens or polyacrylonitrile (PAN)-based materials or also glass nonwovens. Other examples of materials are mentioned above.

Figure 3:
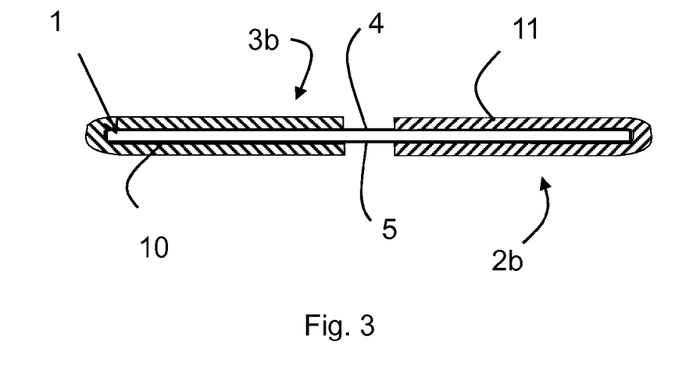

According to the double lamination, the tubular film is turned by 90° here—for example, using a known turning hub—, so that it takes the position shown in FIG. 3, named here as second flat state. In this case, the two edges 4, 5 now lie directly opposite one another. In this second (laid out flat) state, the tubular film 1 now has a new bottom side 3b and a new top side 4b.

Figure 4:
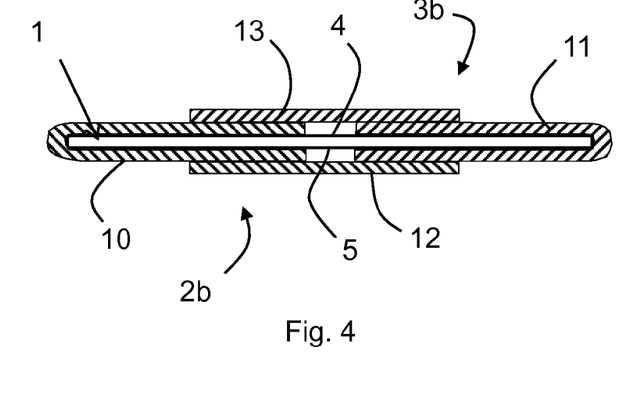

A lamination machine—preferably the same one—is now used once again for laminating these two sides 3b, 4b one after the other with a resin-absorbent layer 12 and 13. The result is the tubular film 1 laminated with four resin-absorbent layers 10-13, as shown in FIG. 4. The important thing in this embodiment is that the resin-absorbent layers 12, 13 cover the edges 4, 5, whereby the widths of the resin-absorbent layers 12, 13 have been selected here to be narrower than the widths of the resin-absorbent layers 10, 11. As a result of this, the multiple layering with resin-absorbent layers is avoided in many areas that do not need it and a savings of material can be accomplished.

The lamination with successive lamination steps described with the help of FIGS. 1-4 can also be done with merely two lamination steps. In this case, the bottom side 2a and the top side 3a are simultaneously laminated in a lamination machine (FIG. 2) designed accordingly. After subsequent twisting or turning of the two-sided laminated tubular film 1 by 90° (see FIG. 3), done for example with a known turning hub, the two sides 2b and 3b now lying down and up are laminated simultaneously in one single lamination step. The result corresponds to the one shown in FIG. 4. The two lamination steps (first the lamination of the bottom side 2a and top side 3a, then the lamination of the bottom side 2b and top side 3b) can be done in a tandem lamination installation in which, for example, the second lamination machine is arranged downstream from the first. The turning hub is arranged between the two lamination machines. A winding of the film laminated in the first lamination step (and, if need be, already twisted or turned by 90°) and a subsequent unwinding before the second lamination are not necessary in this case; winding is foreseen only at the end of the complete lamination process.

In the lamination according to FIGS. 1-4, the widths or the four layers to be laminated can all be equally wide, or different or partially the same and partially different.

Figure 5:
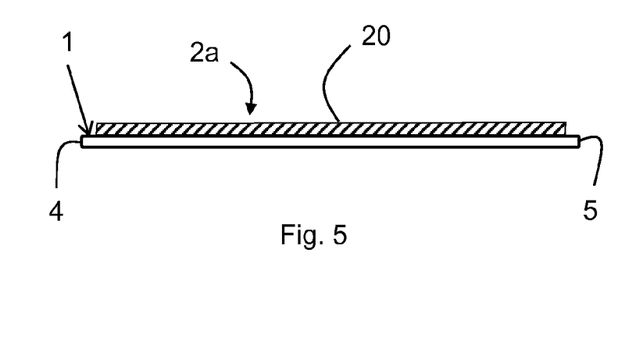
FIGS. 5-9 are successive steps of a second embodiment.
Figure 6:
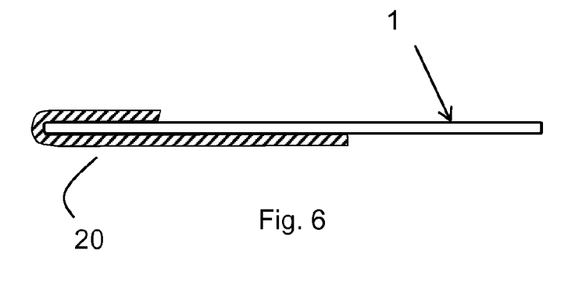
Figure 7:
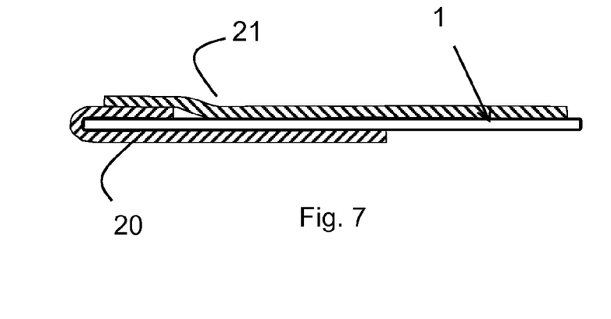
Figure 8:
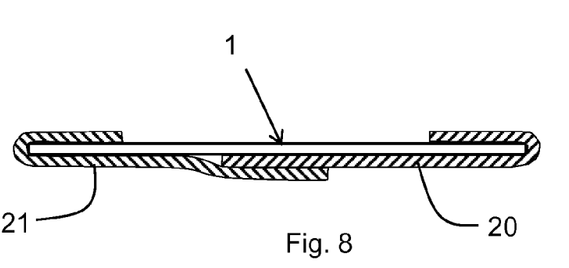
Figure 9:
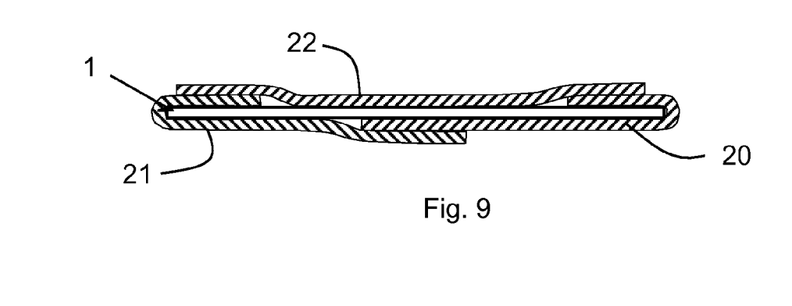
Figure 10:
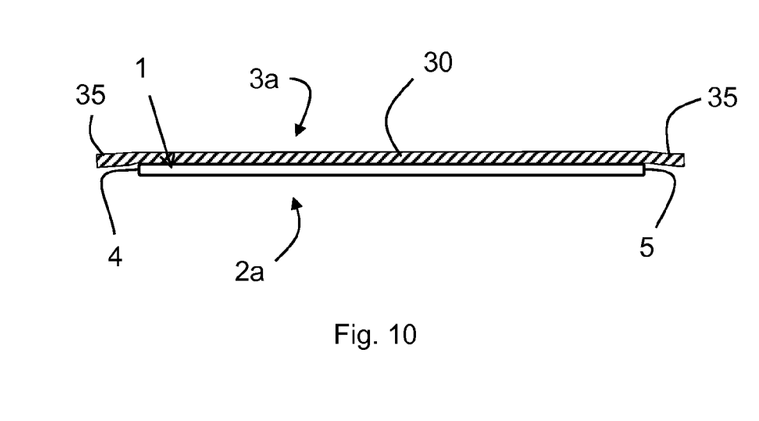
FIGS. 10-13 are successive steps of a third embodiment, in cross section through the film in flat and expanded state.
Figure 11:
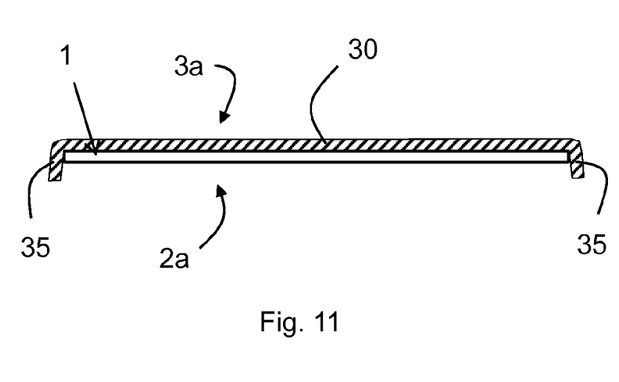
Figure 12:
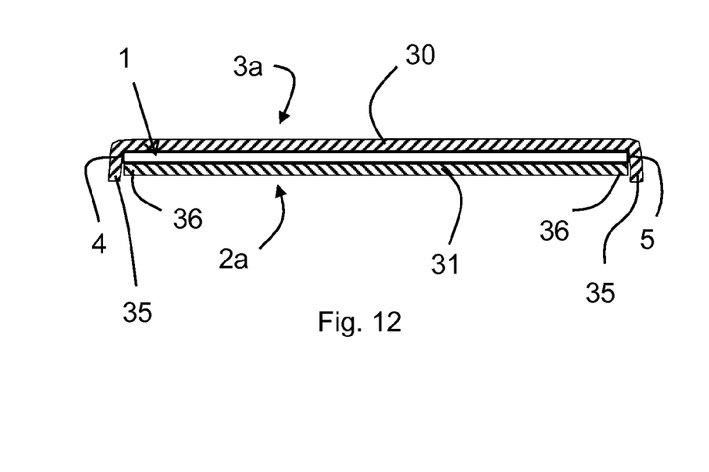

Another lamination option is shown in FIGS. 5-9, where in a first (laid out flat) state of the tubular film 1, one side is laminated—here the top side 12 of the tubular film—with a resin-absorbent layer 20 (FIG. 5). Afterwards, the tubular film is turned by approx. 120° in a second laid-flat state of the tubular film 1 (FIG. 6), so that most of layer 20 is found on the bottom side of the tubular film 1. After that, another resin-absorbent layer 21 (FIG. 7) is laminated on the new top side, and then the tubular film is once again turned by about 120° to a third flat state of the tubular film 1 (FIG. 8). In a last step, a third resin-absorbent layer 22 is laminated, resulting in a tubular film 1 having three resin-absorbent layers 20, 21, 22 (FIG. 9). In this case, the border areas of the three layers 20, 21, 22 overlap.

The angles of approx. 120° given for the second embodiment are not mandatory, but represent a preferable—symmetric—approach in which it is possible to work by turning everything in each case around the same angles and use the sane layer widths in order to obtain equally large overlapping areas of the three lamination layers.

The spaces between the layers and the tubular film shown schematically and of the first or second embodiment do not necessarily mean that they are actually present. Depending on lamination conditions, these spaces can also be closed—partially or fully—by the resin-absorbent layers or by adhesives too.

The described approach ensures that in the case of the second embodiment merely three laminated layers must be laminated in two turning methods, whereas in the first embodiment it is only necessary to turn once, but four lamination layers are needed.

Figure 13:
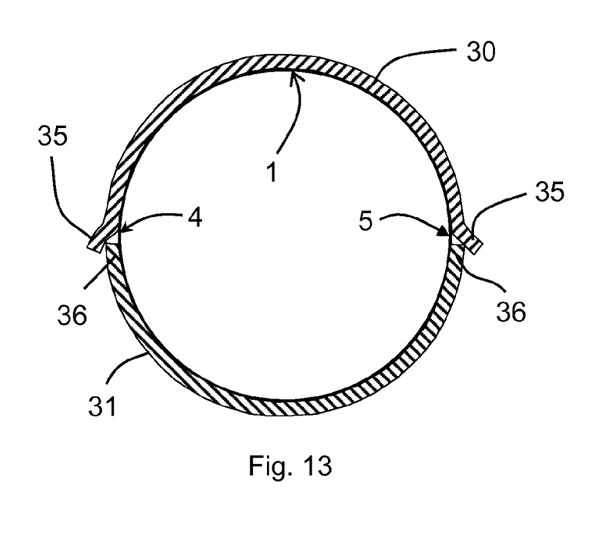

FIGS. 10-13 shows a third embodiment for laminating a tubular film with one layer 30 projecting over both edges 4, 5 that is laminated on the top side 3a of the tubular film. The adhesive or binding polymer used in the extrusion or coating (extrusion coating or extrusion lamination) is also applied in the area of the edges 4, 5, so that the two protruding border areas 35 can be bent downwards by about 90°, pressing against the edges according to FIG. 11. Afterwards, with or without turning the tubular film 1 by 180°, an additional layer 31 is laminated on the other side (bottom side 2a in FIG. 10). The width of layer 31 has been chosen here so it ends essentially flush laterally with edges 4, 5 of the tubular film 1 (see FIG. 12). When the laminated tubular film 1 is expanded, the protruding border areas 35 of layer 30 overlap the ends 36 of layer 31 laminated on the tubular film 1 (FIG. 13). If the intention is to use the tubular film 1 as inner tubular film for trenchless sewage pipe renovation in order to place a resin carrier layer on layers 30, 31, these protruding border areas 35 do not interfere.

A modification of the embodiment shown in FIGS. 10 to 13 provides that the borders 35 of layer 30 are pulled further downwards (i.e. layer 30 is wider than shown in FIGS. 10-13) turned over by almost 180° on the borders 36 of layer 31 and glued to it.

In the third embodiment according to FIGS. 10-13, layer 31 can also be laminated first as an alternative. A further alternative provides the simultaneous lamination of the two layers 30, 31.

Figure 14:
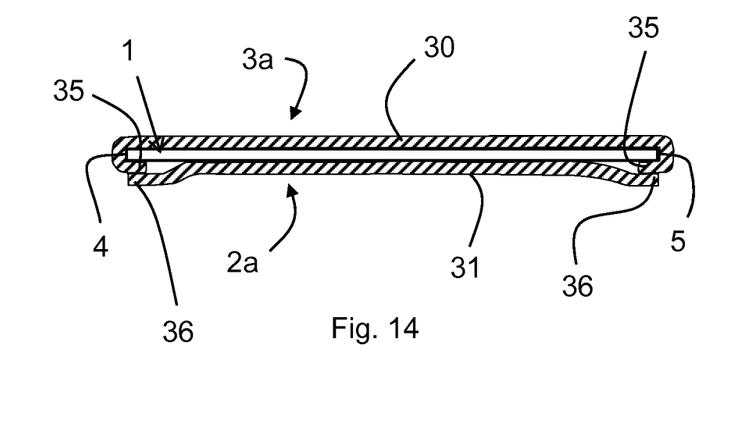
FIGS. 14, 15 is a tubular film laminated in a fourth way in flat and in expanded state, in each case in cross section.
Figure 15:
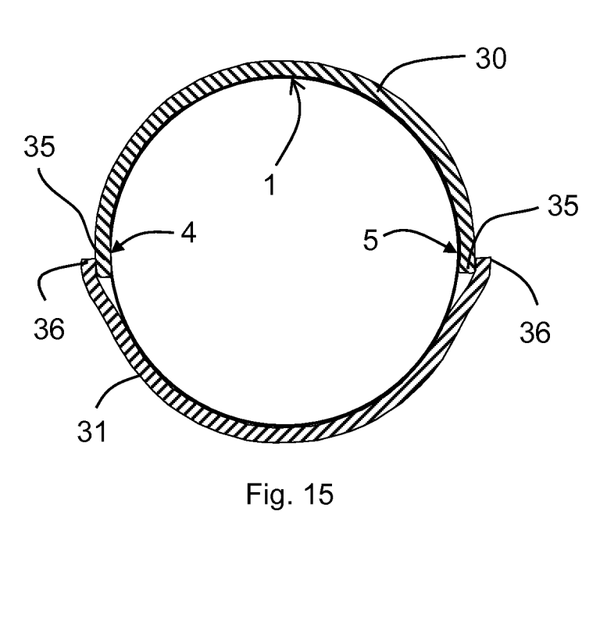

FIGS. 14 and 15 show a fourth embodiment. Here, layer 30 laminated on the top side 3a of the tubular film 1, which is wider than the tubular film 1, is turned over on the edges 4, 5 of the tubular film 1 and therefore it also lies against the bottom side 2a of the tubular film 1 with its borders 35. In this case, the borders 35 are also preferably firmly bonded to the bottom side 2a, especially with glue. The other layer 31 is laminated on these borders 35 and against the still uncovered areas of the bottom side 2a of the tubular film. Here, layer 31 has more or less the width of the tubular film 1. However, layer 31 can also be designed in a narrower way, in which case it will then still overlap the borders 35 of layer 30 with its borders 36.

FIG. 15 shows the tubular film 1 with the laminated layers 30, 31 once again in cross section. It can be discerned how the border areas 35 of the layer 30 lie against the tubular film 1, while the border areas 36 of layer 31 lie against the border areas 35 of layer 30.

Figure 16:
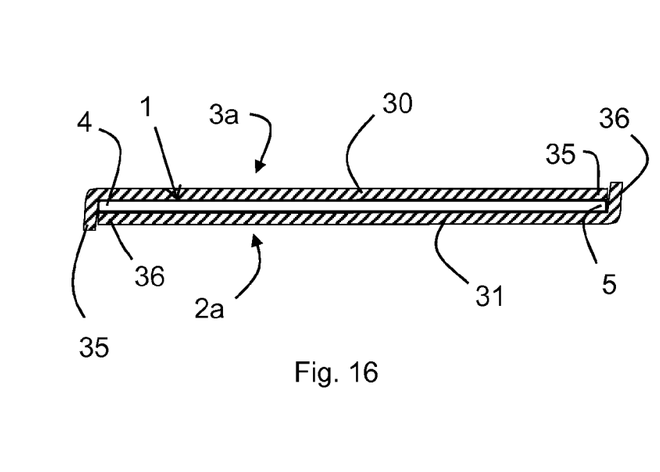
FIGS. 16, 17 is a tubular film laminated in a fifth way in flat and in expanded state, in each case in cross section.
Figure 17:
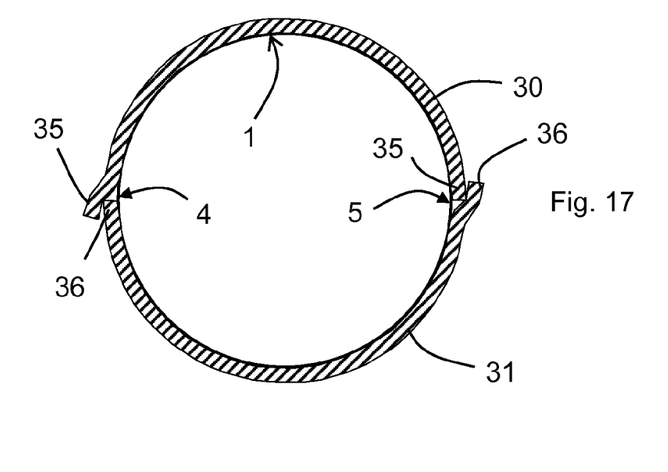

A fifth embodiment is shown in FIGS. 16 and 17. According to FIG. 16, two layers 30, 31 have also been laminated (one after the other or simultaneously) on the bottom and top side 2a, 3a of a tubular film 1 laid out flat. In the left side shown in FIG. 16, the top layer 30 protrudes downward above the edge 4, while on the right side shown in FIG. 16, layer 31 protrudes upwards over the edge 5. Both border areas 35, 36 protruding in such a way are bonded to edges 4 or 5 as with the embodiment according to FIGS. 10-13. The result is therefore an overlapping of the border areas 35, 36 of the two layers 30, 31, as shown in FIG. 17. It is also possible in the embodiment of FIGS. 16 and 17, with at least somewhat wider layers 30, 31, to turn over by almost 180° one protruding border 35 and the other protruding border 36 and to glue them on layer 31 and layer 30, respectively, while applying pressure.

Figure 18:
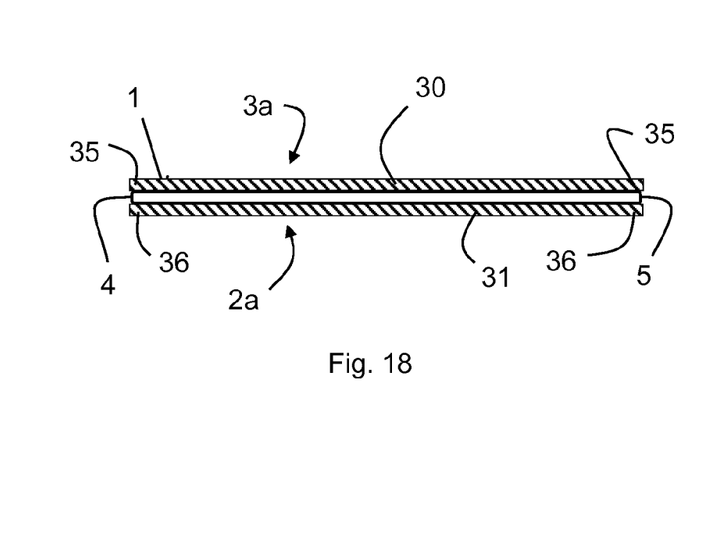
FIGS. 18, 19 is a tubular film laminated in a sixth way in flat and in expanded state, in each case in cross section.
Figure 19:
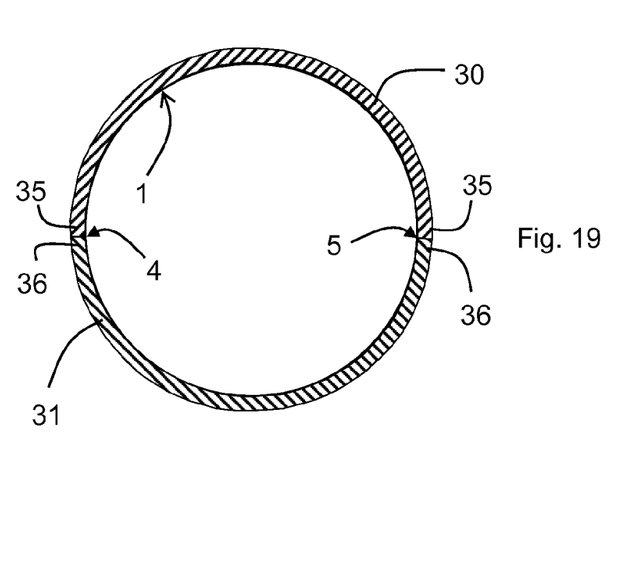

A sixth variant is shown in FIGS. 18 and 19. Here, the two layers 30, 31 end essentially flush with the two edges 4, 5—once again seen in cross section—or protrude slightly (as shown in FIG. 18). The two border areas 35, 36 of layers 30, 31, not overlapping here, bump into one another in the expanded state of the tubular film 1 (FIG. 19) or there is a very small space between them, i.e. the front sides of both layers 30, 31 are directly opposite one another. Preferably, the film is fully covered with the material capable of absorbing resin or liquids.

Figure 20:
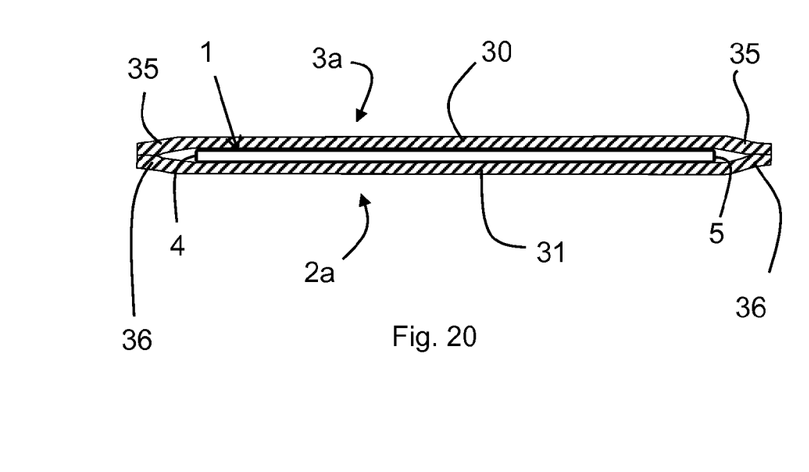
FIGS. 20, 21 is a tubular film laminated in a seventh way in flat and in expanded state, in each case in cross section.
Figure 21:
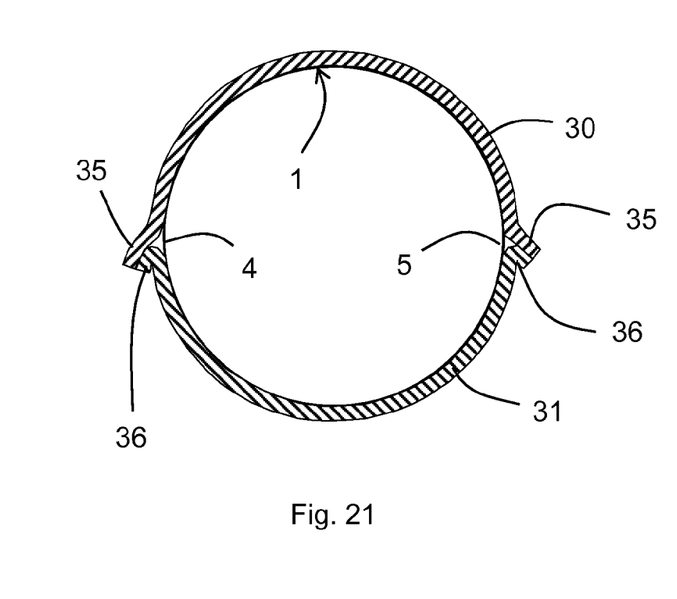

A seventh variant is shown in FIGS. 20 and 21. Here, the two layers 30, 31 project over both edges 4, 5 and their projecting border areas 35, 36 are glued to one another or—to express it in a general way—are joined together, preferably by machine. The corresponding adhesives or glues are advantageously used in such a way that the border areas 35, 36 to be joined together are likewise provided with this glue or adhesive. In this variant, the edges 4, 5 are encapsulated or "welded in" when seen in cross section. If the laminated tubular film 1 is expanded and used as inner tube film, for example, the border areas 35, 36 joined together are folded over, as FIG. 21 shows.

A corresponding sequence of the lamination of a tubular film according to FIG. 20 can look like this: First of all, an adhesive layer is applied on the top side of the tubular film laid out flat to be laminated and die absorbent layer 31, for example in form of a nonwoven, is laminated with a two-sided excess length of a few centimeters, preferably up to 10 cm. The one-sided laminated tubular film 1 is then turned on its own longitudinal axis by 180° and a second adhesive layer is applied from above—to be more precise, both on the now uncovered new tubular film top side film and on the protruding (inner) borders of the first lamination layer 31. Now a second lamination sheet 30 can be laminated, likewise with excess length, whereby the projecting border areas of the first and second lamination layer 30, 31 are also glued with one another.

A possible embodiment for an inner tubular film used for essentially complete lamination according to the invention with nonwoven layers, for example, looks like this:

| Layer number | Composition | Proportion layer in % | Thickness in μm |
|---|---|---|---|
| 1 Nonwoven side | Lupolen 2420 F Exceed 1327 CA | 70 30 | 70 |
| 2 | Admer NF498E | 100 | 10 |
| 3 | Durethan C38 F | 100 | 40 |
| 4 | Admer NF498E | 100 | 10 |
| 5 inside | Lupolen 2420 F Exceed 1327 CA | 70 30 | 70 |

Sum: 200 μm

The multilayered film mentioned above contains on the external ("nonwoven") side to be laminated, which lies opposite the resin-impregnated carrier layer in the tube liner, Lupolen 2420 F, an LDPE made by the LyondellBasell Polymers Co., and Exceed 1327 CA made by the ExxonMobil Chemical Company. The latter is an ethylene copolymer manufactured by means of metallocen catalysis in whose polymerization hexane as additional comonomer is used apart from ethylene.

An adhesive promoter that can be typically used is Admer NF498E, for example, an LDPE modified with maleic anhydride groups made by the Mitsui Co. Admer® substances are PE copolymers with maleic anhydride groups (MA groups) that adhere strongly to PET, EVOH and PA, can be processed very well and are characterized by thermal stability equivalent to conventional PE.

Durethan B40 FAM (Lanxess) is a PA 6 and Durethan C38 F (Lanxess) is a copolyamide of medium viscosity. Basically, commercially available polyamides can be used as polyamides (PA), for example (respective brand names in parentheses) those made by the companies Lanxness (Durethan, see above), BASF (Ultramid), DuPont (Zytel), DSM Engineering Plastics (Akulon, Stanyl), EMS-Chemie (Grilamid, Grivory, Grilon), Evonik (Vestamid, Trogamid), Radici (Radilon, Radiflam, Raditer, Heraform, Heraflex) Rhodia (Technyl,Stabamid), UBE, DSM (Novamid), Atofina (Rilsan).

According to one first example of the lamination according to the invention, during the course of extrusion lamination, the polyethylene (PE) outer or nonwoven side of the tubular film mentioned above (layer number 1) is fully bonded to a 40 g/m² nonwoven (layer with resin-absorbent material) having the name Berotex-LLDPE (version 05) made by Fiberweb Berlin GmbH. The coat weight (CW) of the glue for extrusion lamination is 20 g/m².

According to a second example, during the course of extrusion lamination, the layer with layer number 1 of the above-mentioned multilayered film is bonded completely to the 30 g/m² nonwoven of the Freudenberg Vliesstoffe SE & Co. KG Co. (Lutrabond FD 20030_27). The coat weight (CW) is once again 20 g/m².

According to a third example, during the course of extrusion lamination, the layer with layer number 1 of the multilayered film mentioned above is bonded completely to the 50 g/m² nonwoven of the company Freudenberg Vliesstoffe SE & Co. KG (Lutrabond FD 20050_27). The coat weight (CW) is once again 20 g/m².

It has been found out that elongation until splice or break is not worsened by the above-mentioned lamination examples of the inner tubular film with nonwoven. Quite the contrary, elongation until splice or break even improves when the inner tube film is bonded to the respective nonwoven. The inventors believe that the most likely cause is that the susceptible edges, in particular, are better protected.

The invention is not limited to the embodiments shown in the figures.

The invention claimed is:

1. A method for laminating a tubular film with a liquid or resin absorbing material, comprising:
   laminating the tubular film over its entire perimeter with a plurality of separate layers of the liquid or resin absorbing material ("absorbing material layers") in such a manner that (a) no single absorbent material layer completely encircles the perimeter of the tubular film, (b) a first absorbent material layer partially encircles the perimeter of the tubular film, (c) one or more additional absorbent material layers are used to cover the perimeter of the tubular film between lateral sides of the first absorbent material layer; and (d) the absorbent material layers are bonded to the tubular film or to each other by the laminating step;
   the absorbing material layers overlap along adjacent lateral sides so that there are essentially no areas left along the perimeter of the tubular film that are not covered by the absorbing material layers; and
   in an initial flat state wherein the tubular film has a first side and a second side defined between opposite lateral edges, the tubular film is laminated on the first side with a first absorbing material layer with an excess length that extends beyond at least one of the folded lateral edges, the tubular film laminated on the second side with a second absorbing material layer.

2. The method according to claim 1, wherein the first absorbing material layer is laminated to the tubular film with an excess length over both of the lateral edges of the tubular film in the initial flat state.

3. The method according to claim 1, wherein each of the first and second absorbing material layers is laminated to the tubular film with an excess length over opposite ones of the lateral edges and are pressed against the lateral edges to create a material bond so that in an expanded circular cross-sectional shape of the tubular film, one of the lateral edges is overlapped by the first absorbing material layer and the other lateral edge is overlapped by the second absorbing material layer.

4. The method according to claim 1, wherein each of the first and second absorbing material layers is laminated to the tubular film with an excess length over each of the lateral edges and are pressed against each other at the lateral edges.

5. The method according to claim 1, wherein the first absorbing material layer is laminated to a first side of the tubular film with an excess length over both lateral edges, the second absorbing material is laminated to the second side and has a length corresponding to that of the second side or narrower, wherein the first absorbing material layer is turned and pressed against the lateral edges.

6. The method according to claim 1, wherein the first absorbing material layer is laminated to a first side of the tubular film with an excess length over both lateral edges and is turned over the lateral edges and pressed against the second side of the tubular film, the second absorbing material layer is laminated to the second side of the tubular film and overlaps the turned over portions of the first absorbing material layer.

7. The method according to claim 1, wherein the tubular film is formed as a hose without a sealing seam, or is formed from a flat film and has one sealing seam.

8. The method according to claim 1, wherein the tubular film has a width from 20 mm to 4000 mm when laid out flat, and a thickness of 20 μm to 4000 μm.

9. The method according to claim 1, wherein the tubular film has a layer facing the absorbing material layers that:
   a) contains a thermoplastic olefin homo- or copolymer polyethylene more than 50% by weight, or
   b) contains a polyamide homo- or copolymer more than 50% by weight, or
   c) contains a thermoplastic elastomer (TPE) more than 50% by weight, and
   wherein another layer of the tubular film that does not face the absorbing material layers contains a homo- or copolyamide (PA) or a thermoplastic elastomer (TPE) more than 50% by weight.

10. The method according to claim 1, wherein the absorbing material layers are made of a foam or an elastic material containing fibers in the form of:
    a) Nonwovens,
    b) felts,
    c) woven fabrics,
    d) knit fabrics,
    e) knitted materials, or
    f) unidirectional weaves.

11. The method according to claim 1, wherein the absorbing material layers have:
    a) a basis weight between 5 g/m2 and 1000 g/m2, and
    b) a thickness of up to 1 cm.

12. The method according to claim 1, wherein the laminations are done through extrusion lamination or glue lamination or heat lamination, wherein for heat lamination, an external layer of the tubular film to be laminated is provided with a thermally activated adhesive during extrusion of the film.

13. A method for laminating a tubular film with a liquid or resin absorbing material, comprising:
    laminating the tubular film over its entire perimeter with a plurality of separate layers of the liquid or resin absorbing material ("absorbing material layers") in such a manner that (a) no single absorbent material layer completely encircles the perimeter of the tubular film, (b) a first absorbent material layer partially encircles the perimeter of the tubular film, (c) one or more additional absorbent material layers are used to cover the perimeter of the tubular film between lateral sides of the first absorbent material layer; and (d) the absorbent material layers are bonded to the tubular film or to each other by the laminating step;
    the absorbing material layers overlap along adjacent lateral sides so that there are essentially no areas left along the perimeter of the tubular film that are not covered by the absorbing material layers; and further comprising:
    a) in an initial flat state wherein the tubular film has a top side and a bottom side defined between opposite lateral edges, the tubular film is first laminated on each of the top side and bottom side with a first and a second absorbing material layer, respectively;
    b) the tubular film is brought to a second flat state by turning or rolling the tubular film such that a new top side is formed containing an unfolded one of the lateral edges and a new bottom side is formed containing an unfolded one of the lateral edges, the unfolded lateral edges lying opposite one another;
    c) in the second flat state, the tubular film is laminated with a third absorbing material layer on the new top side that extends over the unfolded lateral edge and overlaps the first absorbing material layer, and laminated with a fourth absorbing material layer on the new bottom side that extends over the unfolded lateral edge and overlaps the second absorbing material layer; and d) wherein a width of the third and fourth absorbing material layers is less than a width of the first and second absorbing material layers.

14. A method for laminating a tubular film with a liquid or resin absorbing material, comprising:

laminating the tubular film over its entire perimeter with a plurality of separate layers of the liquid or resin absorbing material ("absorbing material layers") in such a manner that (a) no single absorbent material layer completely encircles the perimeter of the tubular film, (b) a first absorbent material layer partially encircles the perimeter of the tubular film, (c) one or more additional absorbent material layers are used to cover the perimeter of the tubular film between lateral sides of the first absorbent material layer; and (d) the absorbent material layers are bonded to the tubular film or to each other by the laminating step;

the absorbing material layers overlap along adjacent lateral sides so that there are essentially no areas left along the perimeter of the tubular film that are not covered by the absorbing material layers; and further comprising:

a) in an initial flat state wherein the tubular film has a top side and a bottom side defined between opposite lateral edges, the tubular film is first laminated on one of the top side or bottom side with a first absorbing material layer;

b) the tubular film is brought to a second flat state by turning or rolling the tubular film by an angle greater than 90° such that a new top side and a new bottom side are defined, one of the new top side or new bottom side having less of the laminated first absorbing material layer than the other respective new bottom side or new top side;

c) in the second flat state, the tubular film is laminated on the new top side or new bottom side having less of the laminated first absorbing material layer with a second absorbing material layer that overlaps the first absorbing material layer;

d) the tubular film is brought to a third flat state by turning or rolling the tubular film by an angle greater than 90° so that an unlaminated area of the tubular film is laid out flat along another new top side or bottom side; and e) in the third flat state, the unlaminated area is laminated with a third absorbing material layer that overlaps the first and the second absorbing material layers.

15. The method according to claim 1, further comprising combining the laminated tubular film with an outer tubular film of a tube liner for trenchless sewage pipe renovation, wherein the laminated tubular film is an inner tubular film of the tube liner.

* * * * *